US012657872B2

(12) United States Patent
Weliwitigoda et al.

(10) Patent No.: US 12,657,872 B2
(45) Date of Patent: Jun. 16, 2026

(54) MEAT IDENTIFICATION SYSTEM AND METHOD

(71) Applicant: Marble, Inc., Cambridge, MA (US)

(72) Inventors: Geethika Weliwitigoda, Reading, MA (US); Timothy Kelsey, Arlington, MA (US); Tyler Randolph, Edgefield, SC (US)

(73) Assignee: Marble, Inc., Cambridge, MA (US)

( * ) Notice: Subject to any disclaimer, the term of this patent is extended or adjusted under 35 U.S.C. 154(b) by 339 days.

(21) Appl. No.: 18/307,592

(22) Filed: Apr. 26, 2023

(65) Prior Publication Data

US 2023/0343069 A1 Oct. 26, 2023

Related U.S. Application Data

(60) Provisional application No. 63/335,027, filed on Apr. 26, 2022.

(51) Int. Cl.
*G06V 10/764* (2022.01)
*G06T 7/50* (2017.01)
(Continued)

(52) U.S. Cl.
CPC .............. *G06V 10/764* (2022.01); *G06T 7/50* (2017.01); *G06V 10/25* (2022.01); *G06V 10/82* (2022.01); *G06V 20/68* (2022.01)

(58) Field of Classification Search
CPC ...... G06V 10/764; G06V 10/25; G06V 10/82; G06V 20/68; G06T 7/50; G06T 7/20;
(Continued)

(56) References Cited

U.S. PATENT DOCUMENTS

| 3,653,918 A | 4/1972 | Wallace |
| 3,813,922 A | 6/1974 | Oswald et al. |

(Continued)

FOREIGN PATENT DOCUMENTS

| BE | 1011345 A3 | 7/1999 |
| CN | 211515240 U | 9/2020 |

(Continued)

OTHER PUBLICATIONS

Australian Meat Processor Corporation, "Development of Naked Primal Cut Recognition Software", YouTube, https://www.youtube.com/watch?v=n4J92eaXQCg, Published Apr. 12, 2018.
(Continued)

*Primary Examiner* — Xuemei G Chen
(74) *Attorney, Agent, or Firm* — Fredrikson & Byron, P.A.

(57) ABSTRACT

A meat identification system and method are disclosed. The system obtains at least one frame of image data of a cut of meat moving along a path, and identifies the cut of meat based upon the image data in the at least one frame. For this purpose, in one embodiment, the system includes a conveyor and an image acquisition system configured to obtain at least one frame (e.g., 5-15 frames, such as 10 frames) of image data of a cut of meat moving along the conveyor. The system predicts a class of meat based upon the image data to identify the cut of meat. In examples, the system also obtains weight data and depth data relating to the cuts of meat as the cuts move along the path, and can use the weight data and/or the depth data, in conjunction with the image data, to identify the cuts of meat.

17 Claims, 9 Drawing Sheets

(51) Int. Cl.

| | |
|---|---|
| *G06V 10/25* | (2022.01) |
| *G06V 10/82* | (2022.01) |
| *G06V 20/68* | (2022.01) |

(58) Field of Classification Search
CPC ............. G06T 7/70; G06T 2207/10016; G06T 2207/10024; G06T 2207/10028; G06T 2207/20081; G06T 2207/20084; G06T 2207/30128; G06T 7/0004
See application file for complete search history.

(56) References Cited

U.S. PATENT DOCUMENTS

| | | | |
|---|---|---|---|
| 3,960,000 | A | 6/1976 | Barnett et al. |
| 3,960,001 | A | 6/1976 | Hayes |
| 6,267,661 | B1 | 7/2001 | Melville |
| 6,729,110 | B2 | 5/2004 | Sperry et al. |
| 6,932,751 | B1 | 8/2005 | Ward et al. |
| 6,971,221 | B2 | 12/2005 | Sperry et al. |
| 7,386,968 | B2 | 6/2008 | Sperry et al. |
| 7,603,833 | B2 | 10/2009 | Koke |
| 8,505,361 | B2 | 8/2013 | Miller et al. |
| 8,800,251 | B2 | 8/2014 | Brinkman et al. |
| 9,592,983 | B2 | 3/2017 | Costanzo et al. |
| 9,796,537 | B2 | 10/2017 | Lang |
| 9,898,001 | B2 | 2/2018 | Michalscheck et al. |
| 10,690,534 | B2 | 6/2020 | Ragan |
| 10,781,052 | B2 | 9/2020 | Fourney |
| 11,080,496 | B2 | 8/2021 | Velagapudi et al. |
| 11,286,116 | B2 | 3/2022 | Teichrob et al. |
| 11,803,958 | B1 * | 10/2023 | Arkfeld ................. G06T 7/0008 |
| 12,001,183 | B2 | 6/2024 | Foltin et al. |
| 12,006,169 | B2 | 6/2024 | Byrne et al. |
| 2002/0038753 | A1 | 4/2002 | Ursu |
| 2004/0151364 | A1 | 8/2004 | Kenneway et al. |
| 2006/0266005 | A1 | 11/2006 | Koke et al. |
| 2007/0017181 | A1 | 1/2007 | Jacobsen et al. |
| 2007/0207242 | A1 | 9/2007 | Carlsen |
| 2008/0036139 | A1 | 2/2008 | Reyner et al. |
| 2009/0214724 | A1 | 8/2009 | Gordon et al. |
| 2012/0027897 | A1 * | 2/2012 | Innocenzi ............... A23L 33/15 426/231 |
| 2014/0079291 | A1 | 3/2014 | Johnson |
| 2015/0161170 | A1 * | 6/2015 | Yee .................... G06F 16/5846 382/224 |
| 2016/0027167 | A1 | 1/2016 | Johnson |
| 2016/0124742 | A1 | 5/2016 | Rangasamy et al. |
| 2017/0174439 | A1 | 6/2017 | Ripley |
| 2017/0212028 | A1 * | 7/2017 | Correia De Matos Nolasco Lamas ............... G01N 15/1436 |
| 2018/0099769 | A1 | 4/2018 | Mcdonald et al. |
| 2018/0188108 | A1 * | 7/2018 | Fawzy .................... G01J 3/027 |
| 2020/0193587 | A1 * | 6/2020 | Mairhofer ............. G06T 7/0004 |
| 2020/0207500 | A1 | 7/2020 | Kalinowski et al. |
| 2020/0334806 | A1 * | 10/2020 | Hieda .................... G01N 21/84 |
| 2021/0015113 | A1 * | 1/2021 | Aggarwal ............... G06F 18/40 |
| 2021/0120737 | A1 * | 4/2021 | Wang .................... G06T 7/0004 |
| 2021/0204553 | A1 * | 7/2021 | Mehta .................... G06V 10/82 |
| 2021/0321820 | A1 * | 10/2021 | Hendershot ............. F25D 13/06 |
| 2021/0383096 | A1 * | 12/2021 | White .................... G06N 20/00 |
| 2022/0046292 | A1 * | 2/2022 | Nair ...................... G06N 20/00 |
| 2022/0129669 | A1 * | 4/2022 | Devassy ................ G06V 40/10 |
| 2022/0214243 | A1 | 7/2022 | Li et al. |
| 2023/0241776 | A1 | 8/2023 | Kuck et al. |
| 2023/0267704 | A1 * | 8/2023 | Bae ...................... G06V 10/764 382/224 |
| 2023/0270126 | A1 * | 8/2023 | Sreeram ................. B25J 9/1697 700/259 |
| 2023/0316481 | A1 * | 10/2023 | Ngadi ..................... G06T 7/136 382/110 |
| 2023/0347386 | A1 | 11/2023 | Harris et al. |
| 2024/0104762 | A1 * | 3/2024 | Murakami .............. G08G 1/16 |
| 2024/0370740 | A1 * | 11/2024 | Haghighat ............... G06N 5/02 |

FOREIGN PATENT DOCUMENTS

| | | | | |
|---|---|---|---|---|
| EP | 719717 | A1 | 7/1996 | |
| EP | 1127812 | A1 | 8/2001 | |
| EP | 1984122 | B1 | 9/2014 | |
| KR | 20210157509 | A * | 12/2021 | .......... G06V 30/144 |
| WO | 9855379 | A1 | 12/1998 | |
| WO | 2004037652 | A1 | 5/2004 | |
| WO | 2004045952 | A1 | 6/2004 | |
| WO | 2018136377 | A1 | 7/2018 | |
| WO | 2020033635 | A1 | 2/2020 | |
| WO | 2021237011 | A1 | 11/2021 | |

OTHER PUBLICATIONS

Australian Meat Processor Corporation, "Final Report Identification of Bagged Racks Using Machine Learning Algorithms", Prepared by MEQ Probe, Published Apr. 12, 2022, pp. 25.

Australian Meat Processor Corporation, "Final Report Identification of Naked Loins Using Machine Learning Algorithms", Prepared by MEQ Probe, Published Mar. 29, 2022, pp. 37.

Australian Meat Processor Corporation, "In plant trial of robotic picking and packing system" Prepared by Strategic Engineering Pty Ltd, Published Nov. 16, 2023, pp. 34.

Australian Meat Processor Corporation, "Integrated Robotic Picking and Packing of Primal Cuts", Prepared by Strategic Engineering Pty Ltd, Published Dec. 7, 2017, pp. 48.

Australian Meat Processor Corporation, "Integrated Robotic Picking and Packing of Primal Cuts", YouTube, https://www.youtube.com/watch?v=_i93fHwshq4, Published Apr. 23, 2018.

Australian Meat Processor Corporation, "Naked Primal Cut Recognition Vision System Trial in Plant", Prepared by Strategic Engineering Pty Ltd, Published Sep. 25, 2020, pp. 37.

Australian Meat Processor Corporation, "Pick and Pack—End Effector Gripper Development", Prepared by Scott Technology, Published Feb. 2016, pp. 26.

Rosemountct4215, "Inline Leak Detection for Meat Packaging", Emerson.com/RosemountCT4215, 2022, pp. 2.

American Conveyor Group, SmartPace Dynamic Pacing Conveyor, Feb. 23, 2017, https://web.archive.org/web/20170223184834/https://acgconveyors.com/partners/dorner-smartpace-conveyor/ (Year: 2017).

\* cited by examiner

MEAT IDENTIFICATION SYSTEM AND METHOD

RELATED APPLICATIONS

This application claims the benefit under 35 USC 119(e) of previously filed U.S. Provisional Application No. 63/335,027 filed on Apr. 26, 2022, which is incorporated herein by reference in its entirety.

FIELD OF THE INVENTION

Illustrative embodiments of the invention generally relate to identifying objects and, more particularly, various embodiments of the invention relate to identifying different types of meat products.

BACKGROUND OF THE INVENTION

Meat processing facilities include meat processing systems that accept either entire animal carcasses or smaller portions of meat previously rendered from the carcasses, and process the carcasses or smaller portions into different cuts of meat at the same time. The meat processing facilities generally include primary and secondary meat processing facilities.

The primary meat processing facilities (e.g., slaughterhouses) generally break down entire animal carcasses into individual cuts of meat. For this purpose, the meat processing systems at the processing systems typically first split entire carcasses into two sides and breaks down the sides into several large sections, also known as "primals." The primals are then broken down into smaller pieces known as "subprimals." Examples of subprimals include the following cuts of meat: chuck roll, chuck eye, chuck tender, clod roll, in examples. Other subprimal cuts of meat can include brisket, clod, ribeye roll, short ribs, top round, bottom round and strip loin, in examples.

The secondary meat processing facilities, in contrast, typically accept cuts of meat processed by the primary meat processing facilities. Meat processing systems of the secondary facilities further break the meat into smaller portions/smaller cuts of meat. These smaller cuts of meat can include "retail" cuts of meat, such as those sold at grocery stores and sold to restaurants, in examples.

Workers at the meat processing facilities manually identify and sort the different cuts of meat. For this purpose, the meat processing systems include conveyor systems, and the workers are stationed at conveyors of the conveyor systems. The conveyors move the cuts of meat along a path in an assembly-line fashion to the workers. The workers then manually sort the different cuts of meat into groups for transport toward stores, restaurants, and/or end users.

A computing system includes at least one or more central processing units (CPUs) and a memory. The CPUs have internal logic circuits that perform arithmetic operations and execute machine code instructions of applications ("application code") loaded into the memory. The instructions control and communicate with input and output devices (I/O) such as displays, printers and network interfaces.

The CPUs of the computing systems are typically configured as either microprocessors or microcontrollers. A microprocessor generally includes only the CPU in a physical fabricated package, or "chip." Computer designers must connect the CPUs to external memory and I/O to make the microprocessors operational. Microcontrollers, in contrast, integrate the memory and the I/O within the same chip that houses the CPU.

The computing systems can be self-contained systems or can be a collection of distributed computing nodes (software, firmware and/or hardware) that collectively form the computing system. The computing nodes may be included in and communicate over one or more remote networks, included in and communicate over one or more local area networks, or a combination of both remote and local networks.

SUMMARY OF THE INVENTION

Existing meat processing systems at meat processing facilities have limitations. As noted above, workers manually identify and sort the different cuts of meat into groups. This process is labor and time-intensive and increases cost. In addition, this manual process is error-prone. New workers typically require weeks or months of training with experienced workers to properly identify and sort the cuts of meat with minimal error and/or waste. Moreover, meat processing facilities can be hectic workplaces that require workers to process and identify the cuts of meat at a steady pace. Business objectives such as the need to increase speed of the assembly line to increase yield can impact accuracy of the identification of cuts of meat and worker safety, in examples.

An inventive meat identification system for use in a meat processing system is proposed. In accordance with one embodiment of the invention, the meat identification system includes a video camera that is configured to obtain at least one frame (e.g., 5-15 frames, such as 10 frames) of image data of a cut of meat moving along a conveyor. The system also includes a classification system configured to read the at least one frame of image data and identify the cut of meat as a function of the image data in the at least one frame. This image data can include red/green/blue (RGB) pixel color information of the cut of meat, in one example. Other components of the meat processing system can then use the information identifying the cuts of meat to perform other tasks, such as to automate sorting of the cuts of meat into different "bins" or groups for packing and inspection, in one example.

The proposed meat identification system has advantages over the existing, manual methods for identifying/classifying cuts of meat. In examples, the system minimizes error when identifying the cuts of meat, can reduce worker fatigue and injury, and may improve yield without sacrificing the accuracy of the identification of the cuts of meat. In examples, the proposed meat identification system can be included in or otherwise employed at both primary and secondary meat processing facilities.

In general, according to one aspect, the invention features a meat identification system. The system includes an imaging system configured to obtain at least one frame of image data of a cut of meat moving along a path, and a classification system configured to read the at least one frame of image data and identify the cut of meat based upon the image data in the at least one frame.

In embodiments, the meat identification system includes a conveyor configured to move a plurality of cuts of meat along the path. For this purpose, the imaging system is positioned to obtain the at least one frame of image data of the plurality of cuts of meat as the conveyor moves the plurality of cuts of meat along the path.

In addition or alternatively, the meat identification system also may include a depth sensor to detect depth information about the cut of meat. In this case, the classification system is configured to identify the cut of meat as a function of the depth data (in addition to the image data). Some implementations may include a scale to weigh the cut of meat to determine weight data of the cut of meat. In this case, the classification system may be configured to identify the cut of meat utilizing the weight data as an additional input parameter to the classification system.

To facilitate identification, the classification system may be configured to segment the at least one frame to produce segmented information, and subsequently form a bounding box around the cut of meat using the segmented information. The classification system can then extract pixels of the cut of meat enclosed by the bounding box into an instance of object data for the cut of meat. The classification system can then pass the object data for the cut of meat to a machine learning module, the output of which includes a predicted class of meat to identify the class of meat.

Moreover, those skilled in the art may form the classification system using a variety of technologies. For example, the classification system may include an artificial intelligence ("AI") or machine learning component or model (e.g., using a convolutional neural network). When using an AI component or other technique, the classification system may be configured to produce a confidence score relating to the cuts of meat. Higher confidence scores may indicate the most appropriate identification of the cut of meat.

The cut of meat may also be identified when included within a package, such as a vacuum packed package. The package/packaging is preferably made of clear plastic or other transparent material, thus enabling the imaging system to capture the cut of meat in the frames of image data. Undesirably, the package may produce an extra glare component that impedes the imaging system. To obviate or minimize this issue, the meat identification system may include a hood configured to reduce glare on the cut of meat. It should be noted that the hood also can be configured to reduce glare even when the cut of meat is not within packaging.

In one implementation, the classification system may be configured to obtain a predicted class of meat based on the image data to identify the cut of meat, and to obtain a range of successive frames of image data that include the cut of meat as the meat moves along the path. The classification system can then be configured to use information relating to the cut of meat obtained across the range of frames of image data to finalize the prediction of the class of meat.

In general, according to another aspect, the invention features a meat identification method. The method obtains at least one frame of image data of a cut of meat moving along a path, and identifies the cut of meat based upon the image data in the at least one frame.

In one example, identifying the cut of meat based upon the image data in the at least one frame includes passing information relating to the cut of meat obtained from the at least one frame of image data as input to a machine learning model, the output of which is a predicted class of meat for identifying the cut of meat.

The method can also apply a test dataset to a current version of the machine learning model to obtain training evaluation results concerning the machine learning model, and apply the test dataset to a copy of the machine learning model in a training session to obtain training evaluation results concerning the copy. Then, in response to determining that the training evaluation results of the copy show an improvement as compared to the training evaluation results of the current version of the model, the method can deploy the copy as the current version.

In another example, the method may pass a training dataset to a machine learning model to train the machine learning model to identify the cut of meat. For this purpose, the training dataset may include a plurality of red/green/blue (RGB) color images of the cut of meat obtained at different camera angles.

In one implementation, the method may identify the cut of meat based upon the image data by: segmenting the at least one frame of image data to produce segmented information; forming a bounding box around the cut of meat using the segmented information; extracting pixels of the cut of meat enclosed by the bounding box into an instance of object data for the cut of meat; and calculating a predicted class of meat and a confidence score based upon the object data.

In another implementation, the method may identify the cut of meat based upon the image data by: obtaining a range of successive frames of image data that include the cut of meat as the meat moves along the path; obtaining an instance of a predicted class of meat, for each frame of image data in the range of frames that includes the cut of meat; and calculating a final predicted class of meat based upon the instances of the predicted class of meat across the range of frames.

The method may also detect depth data about the cut of meat, and identify the cut of meat based upon the image data and the depth data. The method may also detect weight data about the cut of meat, and identify the cut of meat based upon the image data and the weight data.

In general, according to another aspect, the invention features a computer program product comprising at least one processor and a memory including computer program code. The at least one processor and the memory are configured to receive at least one frame of image data of a cut of meat moving along a path, and read the at least one frame of image data and identify the cut of meat based upon the image data in the at least one frame.

It should be noted that various embodiments of the meat identification system may apply to a wide variety of meat products. Among others, those meat products may derive from a number of organic sources, such as cows, pigs, poultry (e.g., turkey, chicken), deer, fish, in examples. As a result, the term "meat" includes beef, poultry, pork, chicken, turkey, or the like.

Illustrative embodiments of the invention may be implemented as a computer program product having a computer usable medium with computer readable program code thereon. The computer readable code may be read and utilized by a computer system in accordance with conventional processes.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
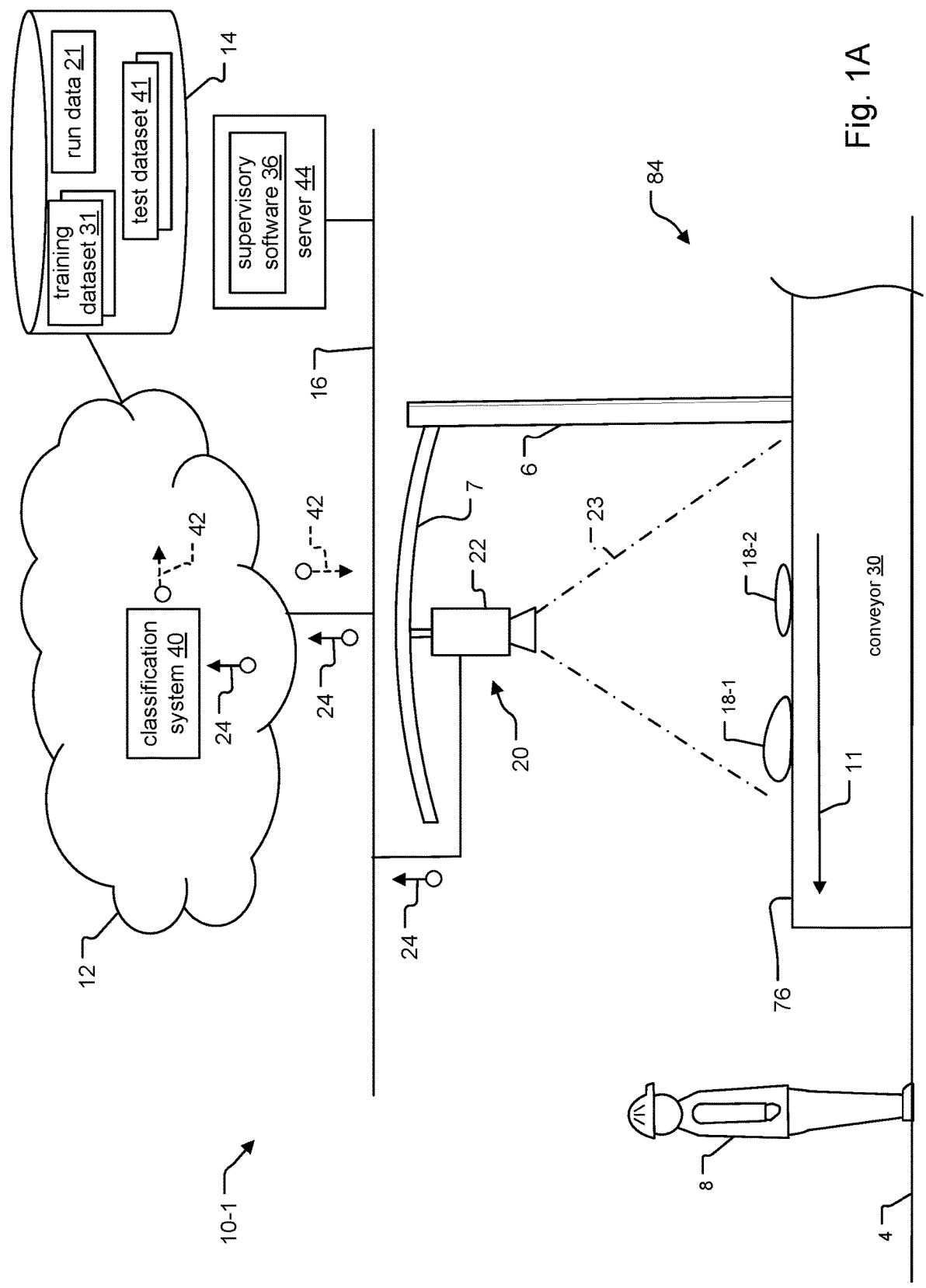
FIG. 1A is a schematic diagram of an inventive meat identification system, according to an embodiment.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" or "current" and "previous" may be used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In illustrative embodiments, a meat identification system identifies/predicts classes of cuts of meat as they traverse through a conveyor system (e.g., at a meat processing plant). To that end, the meat identification system includes a video camera that captures frames of image data that each possibly include one or more cuts of meat. The frames of image data are captured when the cuts of meat arrive at a conveyor of the conveyor system. A classification system uses the image data, e.g., red/green/blue (RGB) pixel color information, to identify each cut of meat in the image data over time.

Probabilistic and artificial intelligence techniques can be implemented. Some embodiments additionally use other sensory information, such as weight data and/or depth data, and/or a volume of the cut of meat calculated from the depth data, to more precisely identify the cuts of meat, in examples. Details of illustrative embodiments are discussed below.

FIG. 1A shows an example meat identification system 10-1, according to an embodiment. The system 10-1 is preferably included or otherwise installed in a meat processing facility that processes meat including beef, poultry, pork or the like. The system 10-1 includes components that are local to the processing facility and also includes other components that are remote to the processing facility. The system 10-1 can be installed in either primary or secondary meat processing facilities.

The system 10-1 includes a conveyor 30, a server 44 and an imaging system 22 such as a video camera 22. The system 10-1 also includes a classification system 40 within a remote network 12 and a database 14 that connects to the remote network 12.

The video camera 22 is an imaging system 20 that captures data of a scene in a field of view 23 of the camera 22. Here, the data is in the form of image data 24 assembled in frames of video.

The conveyor 30 is a component of a conveyor system 82 at the processing facility; only the conveyor 30 is shown. The conveyor 30 includes a conveyor belt 76 that moves one or more cuts of meat 18 along a path 11 of the conveyor system 82. In the illustrated example, the conveyor belt 76 is moving two different cuts of meat 18-1 and 18-2 towards the worker 8.

The server 44 and the video camera 22 connect to and communicate over a local area network 16. The local area network 16 is local to the facility that includes the system 10-1 and is a data communications network such as wired or wireless Ethernet. A worker 8 is shown stationed on a floor 4 at the conveyor 8.

The local area network 16 has a connection to the remote network 12. In this way, the server 44, and the imaging system 22 can access information from or store information to the remote network 12 or the database 14. The remote network 12 can be a public network such as the Internet, or a private network such as a Wide Area Network (WAN) or Metropolitan Area Network (MAN), in examples. Because the remote network 12 can include or otherwise connect to many distributed computing nodes and storage devices, the remote network 12 is also referred to as a network cloud, and the storage it can provide is also known as cloud storage.

In the illustrated example, the classification system 40 is included within the remote network 12. The classification system 40 and the capabilities that it provides may be part of a remote service/cloud service such as Amazon Web Services (AWS), IBM Cloud, Google Cloud Platform (GCP) and Microsoft Azure, in examples. AWS and Azure are registered trademarks of Amazon.com, Inc. and Microsoft Corporation, respectively.

The server 44 includes supervisory software 36 that controls operation of the system 10-1 and its components. Workers 8 can access the supervisory software 36 via a software application executing on a user device computing system. The user devices can include a mobile phone, a laptop computer, a computer workstation, a custom control panel of the system 10-1, or the like.

The database 14 includes run data 21, one or more training datasets 31 and one or more test datasets 41. The run data 21, for example, can include information associated with operation of the system 10-1 and its components, and can include information obtained by the system 10-1 concerning the cuts of meat 18 and stored to the run data 21. Moreover, the run data refers to any data associated with configuration of the meat identification system 10, and any post-operation outputs of the system 10. These can include: the image data 24 that the imaging system 20 obtains during run-time operation, and any information that the system 10 extracts or calculates from the image data (such as the predicted class of meat for each cut of meat) and/or is otherwise related to the image data, in examples. This information is typically stored in the form of time-stamped records to the run data 21 for later analysis and comparison.

The training dataset(s) 31 include information for training one or more machine learning models of the classification system 40. The test dataset(s) 41 include information for testing the one or more machine learning models. The testing and training may be performed prior to operation of the system 10, and/or continuously during operation of the system 10.

It can also be appreciated that the run data 21, the training datasets 31 and the test datasets 41 may be stored to the server 44, other computing system on the local area network 16, other computing system or storage device in the remote network 12, or possibly be distributed across multiple components within or attached to the remote network 12.

In the illustrated example, the server 44 and the classification system 40 are separate computing systems. In one implementation, the classification system 40 might be a software or firmware component of a different computing system that resides in the network cloud 12.

The system 10-1 is typically arranged as follows. The video camera 22 is positioned above the conveyor 30 and is attached to an overhang or hood 7, which in turn is fastened to a pylon 6. The video camera 22 is positioned such that a significant portion of the conveyor belt 76 is included within a field of view 23 of the video camera 22. In the illustrated example, the two different cuts of meat 18-1, 18-2 are included within the field of view 23.

The system 10-1 generally operates as follows. Workers 8 access applications ("apps") on user devices in order to connect to the supervisory software 36 on the server 44. Via the apps and the supervisory software 36, the workers 8 can configure the system 10-1 and its components and control operation of the system 10-1.

As the cuts of meat 18 travel along the path, the cuts of meat arrive at the conveyor. The video camera 22 continuously captures frames of image data 24 of a scene in the camera's field of view 23. When the cuts of meat 18 are included within the field of view 23, the image data 24 includes a pixelized representation of the cuts of meat (e.g., RGB pixels). In this way, the image data is said to "include the cuts of meat 18." At this stage of the processing, the cuts of meat 18 may be vacuum packed in a clear plastic bag or other transparent containing apparatus, although various embodiments apply to meat that is not packaged in this manner (e.g., packaged in some non-vacuum packed packaging), or not packaged at all.

Typically, the conveyor 30 is configured by the server 44 or other component to move a plurality of cuts of meat 18 along the path 11, such that the imaging system 20 is positioned to obtain the at least one frame of image data 24 of the plurality of cuts of meat 18 as the conveyor 30 moves the plurality of cuts of meat 18 along the path 11.

The hood 7 provides a diffuse lighting environment and/or reduces glare (e.g., from packaging around the meat) during the capture of the image data 24. This minimizes image artifacts induced by the glare in the image data 24.

The video camera 22 then sends the image data over the local area network 16 to the server 44. The server collects and/or buffers the frames of image data 24 and streams the image data 24 to the classification system 40 for analysis. In one implementation, the video camera 22 might stream the image data 24 directly to the classification system 40.

The classification system 40 then identifies different cuts of meat based on the image data 24. Each identified cut of meat is a prediction of a class of meat 42, obtained by the classification system 40 based upon the image data 24. Examples of classes of meat include chuck roll, chuck eye, chuck tender, clod roll, brisket, clod, ribeye roll, short ribs, top round, bottom round and strip loin, in examples.

As a result, the system 10-1 includes an imaging system 20 and a classification system 40. The imaging system 20 is configured by the server 44 or other component to obtain at least one frame of image data 24 of a cut of meat 18 moving along a path 11, and the classification is configured to identify the cut of meat 18 based upon the image data 24 in the at least one frame.

Figure 1B:
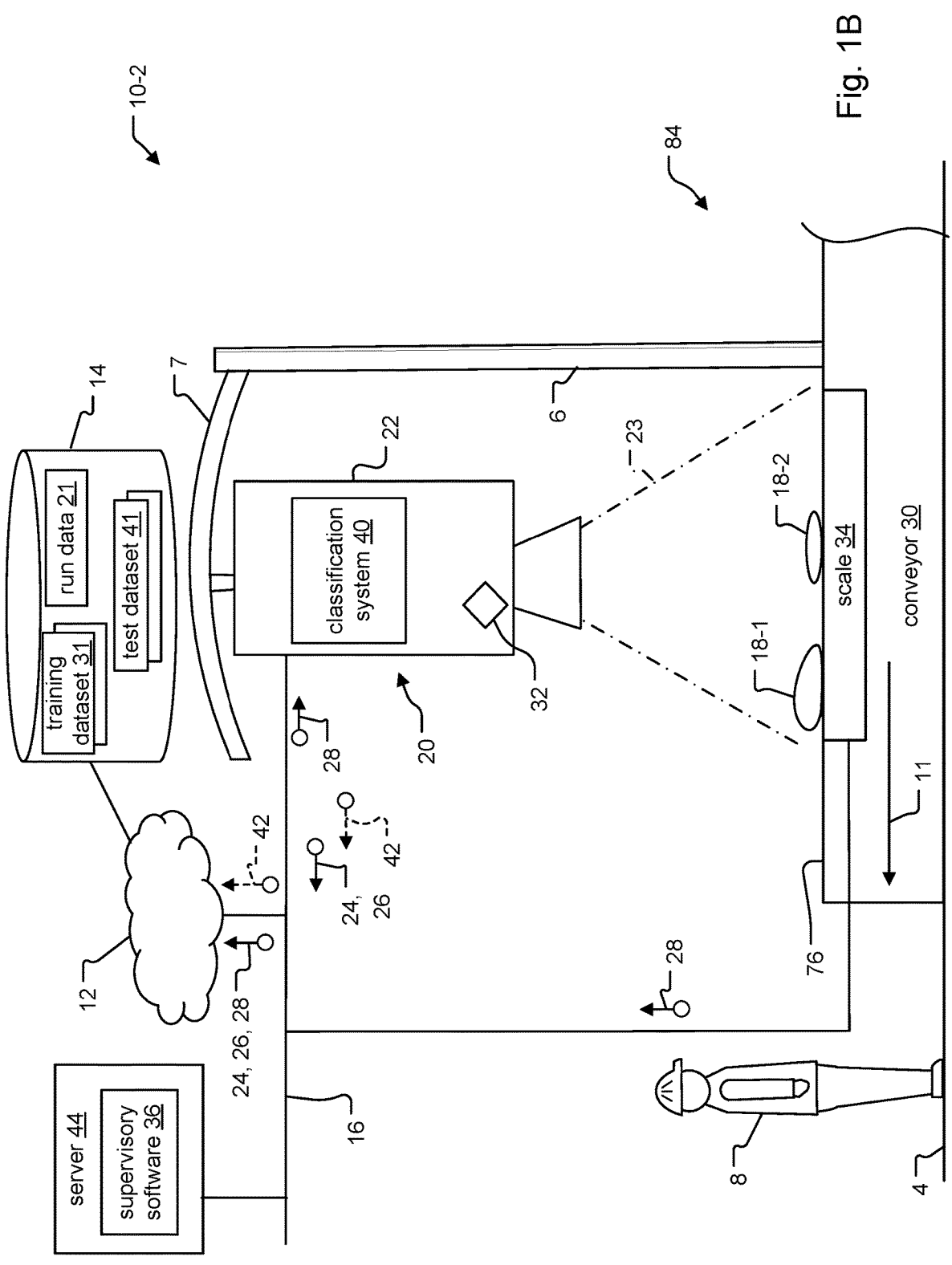
FIG. 1B-1D are schematic diagrams of other inventive meat identification systems, according to additional embodiments.

FIG. 1B shows another exemplary meat identification system 10-2, according to another embodiment. The system 10-2 has substantially similar components as and operates in a substantially similar way as the system 10-1 of FIG. 1A. However, there are differences.

In FIG. 1B, the classification system 40 is included within the video camera 22. Here, the classification system 40 might be a software or firmware process executing upon a processor of the video camera 22. The video camera 22 also includes a depth sensor 32 that obtains depth data 26 within a field of view of the depth sensor 32. Here, the field of view 23 of the video camera 22 might also operate as the field of view of the depth sensor 32.

The conveyor 30 also includes one or more scales 34 that obtain time-stamped weight data 28 of the cuts of meat 18-1. One scale 34 is shown. The scale 34 is connected to and communicates over the local area network 16. In this way, the scale 34, the video camera 22 and the depth sensor 32 can exchange information with one another and with other components that connect to the local area network 16. Thus, the system 10-2 may include The combination of the video camera 22 and the depth sensor 32 can also form an imaging system 20. This imaging system 20 can include any of a variety of configurations. For example, the imaging system 20 can include a combination high resolution RGB-depth camera or a RGB camera without depth capability. In another example, the video camera 22 and the depth sensor 32 are separate components.

Thus, in one implementation, the system 10-2 may include a depth sensor 32 to detect depth data 26 about a cut of meat 18, and the classification system 40 may be configured by the server 44 or other component to identify the cut of meat 18 based upon the image data 24 and the depth data 26. In another implementation, the system 10-2 may include a scale 34 to weigh a cut of meat 18 to determine weight data 28, and the classification system 40 is configured by the server 44 or other component to identify the cut of meat 18 based upon the image data 24 and the weight data 28.

During operation of the system 10-2, as the cuts of meat 18 flow along the path 11 via the conveyor belt 76, the imaging system 20 captures both RGB image data 24 and, in some embodiments, depth data 26 at a sufficient capture rate. Preferably, the imaging system 20 captures more than one frame of image data 24 and depth data 26 for each meat product (e.g., between 2-15 frames, such as 10 frames). Concurrently, in some embodiments, as the imaging system 20 captures the image data 24 and the depth data 26, the scale 34 measures the weight of the cuts of meat 18 and sends associated weight data 28 to the classification system 40.

In one example, as illustrated in the figure, the classification system 40 uses the image data 24 and the depth data 26, in conjunction with the weight data 28, to identify the cuts of meat/to obtain the prediction of a class of meat 24 for each cut of meat 18. Upon obtaining the predictions for each class of meat, the classification system 40 can send the image data 24, the depth data 26, the weight data 28 and the predictions of the classes of meat 42 in messages to the database 14, which stores the information to the run data 21 for future use. Additionally or alternatively, the classification system 40 might send this information in messages to the supervisory software 36 at the server 44, which then stores the information to the run data 21.

It can also be appreciated that the classification system 40 might use only the image data 24, the image data 24 in conjunction with the depth data 26, or the image data 24 in conjunction with the weight data 28 to identify each cut of meat/to obtain the predictions of each class of meat 24.

Figure 1C:
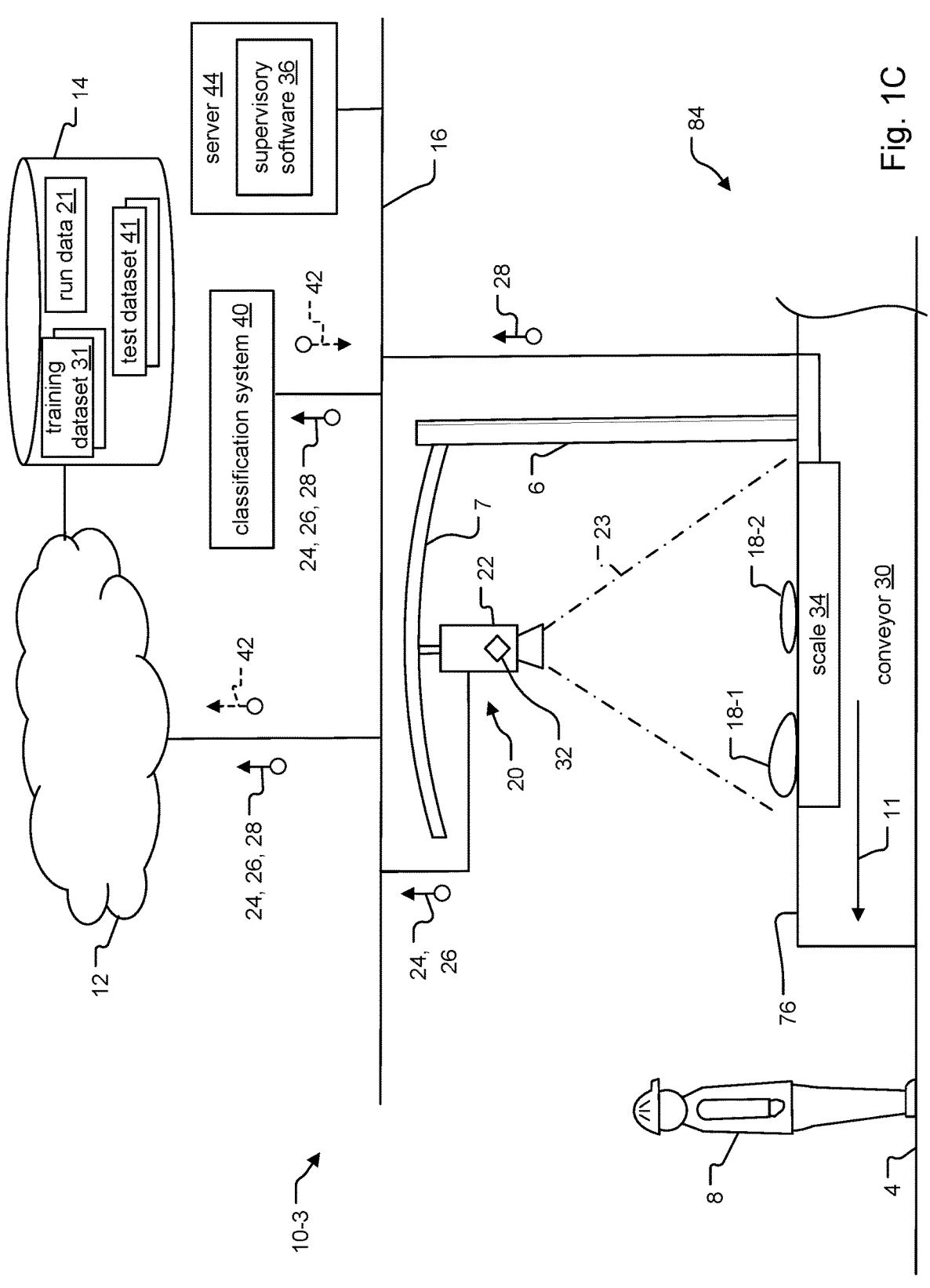

FIG. 1C shows yet another exemplary meat identification system 10-3, according to another embodiment. The system 10-3 has substantially similar components as and operates in a substantially similar way as the system 10-2 of FIG. 1B. However, there are differences.

Here, the classification system 40 is a separate component of the system 10-3 on the local area network 16. The classification system 40 is a computing system that connects to and communicates over the local area network 16 with the server 44, the video camera 22 and the scale 34, in examples.

During operation of the system 10-3, the imaging system 20 sends its image data 24 including the cuts of meat 18 and the depth data 26 associated with the cuts of meat to the classification system 40. The scale 34 also sends its weight data 28 for the cuts of meat 18 over the local area network 16 to the classification system 40. The classification system 40 uses the image data 24 and the depth data 26, in conjunction with the weight data 28, to identify the cuts of meat/to obtain the prediction of the class of meat 42 for each cut of meat 18. Additionally or alternatively, the classification system 40 might use only the image data 24, the image data 24 in conjunction with the depth data 26, or the image data 24 in conjunction with the weight data 28 to identify each cut of meat/to obtain the predictions of each class of meat 42.

Figure 1D:
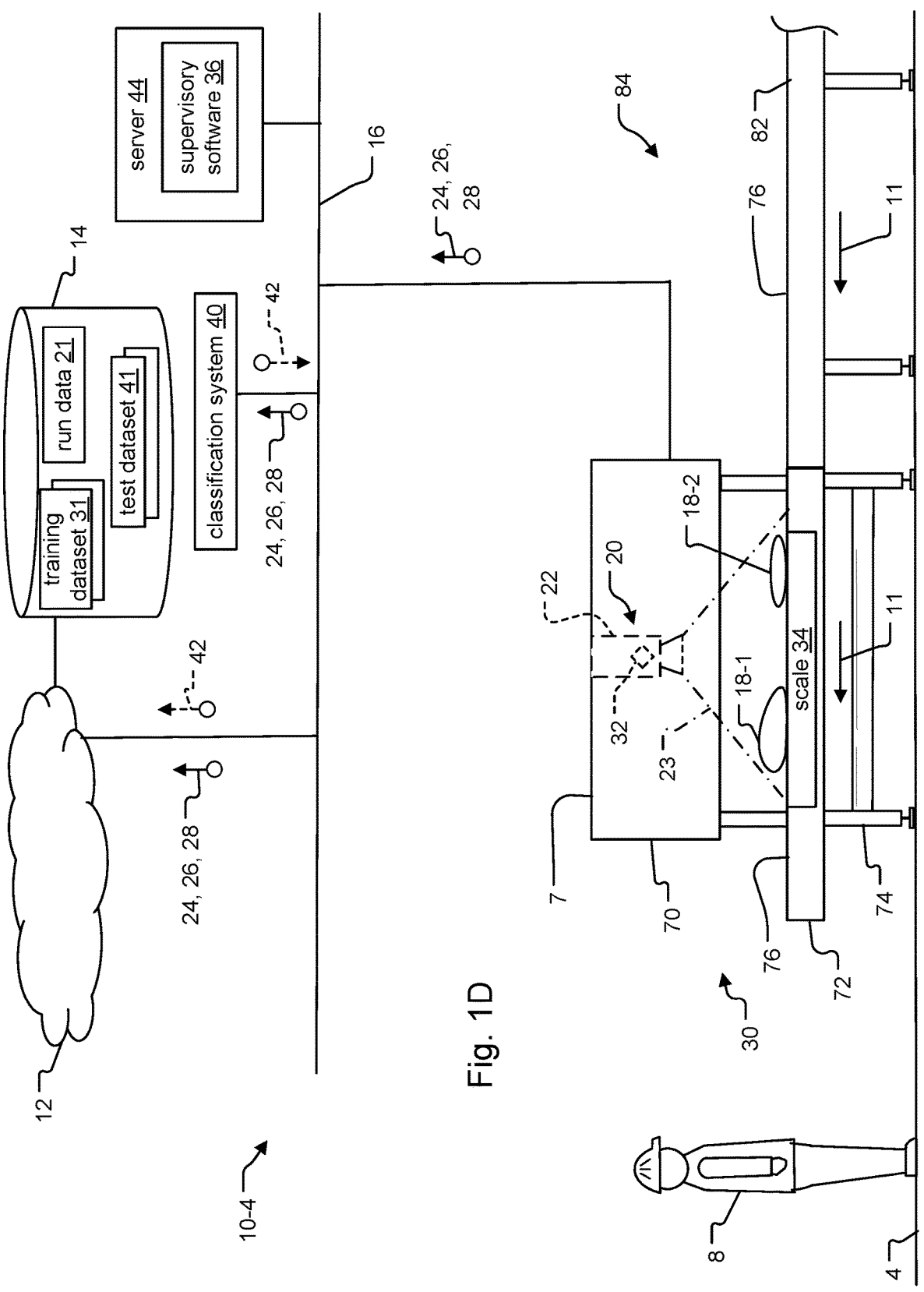

FIG. 1D shows yet another exemplary meat identification system 10-4, according to another embodiment, which is the preferred embodiment. The system 10-4 has substantially similar components as and operates in a substantially similar way as the system 10-3 of FIG. 1C. However, there are differences.

Here, more detail for the conveyor system 84 and the conveyor 30 is shown. The conveyor system 84 additionally includes a table 82 with a conveyor belt 76. The conveyor 30 includes a base 74, a top portion 70 and a bottom portion 72. The imaging system 20, shown in phantom, is included within the top portion 70. The hood 7 is now incorporated into the top portion 70 of the conveyor.

The table 82 is adjacent to and aligns with the bottom portion 72 of the conveyor 30, such that the conveyor belts 76 of the table and the conveyor 30 are substantially in the same horizontal plane. This enables the cuts of meat 18 to move in an assembly-line fashion along the path 11 to the conveyor 30.

In the illustrated example, the conveyor 30 has a common network interface to which the scales 34 and the imaging system 20 connect. In this way, these components can communicate over the local area network 16 via a single connection from the conveyor 30 to the local area network 16.

During operation of the system 10-4, the conveyor 30 sends the image data 24 including the cuts of meat 18, the depth data 26 associated with the cuts of meat and the weight data 28 of the cuts of meat 18 to the classification system 40 for processing. Additionally or alternatively, the classification system 40 might use only the image data 24, the image data 24 in conjunction with the depth data 26, or the image data 24 in conjunction with the weight data 28 to identify each cut of meat/to obtain the predictions of each class of meat 42.

In the illustrated embodiments, the classification system 40 overcomes challenges in identifying and classifying unlabeled vacuum-sealed cuts of meat 18. Among other things, these challenges may include one or more of the following: a wide variation in the size and shape of the cuts of meat 18; an amount and configuration of fat covering a cut of meat 18; different features of a fat side and a lean side of a cut of meat 18; variation in the vacuum-seal; an overhang of the plastic bag beyond the cut of meat 18; random, inconsistent orientations of the cut of meat 18 in a fast-paced chaotic flow; and a shiny surface on the vacuum-sealed plastic package (such as a shrink-wrapped plastic package) that can creates glare and thus complicates image collection and analysis.

Experimentation has shown that different cuts of meat often have unique or relatively unique identifying hallmarks/features and thus, the classification system 40 can use these identifying hallmarks/features to identify cuts of meat 18. To those ends, the imaging system 20 can acquires image data 24 of the cuts of meat 18, and a custom conveyor belt 30 with an optional embedded scale 34 can transport and weigh the meat 18. The supervisory software 36 at the server 44 or other logic can capture the various data inputs (e.g., image data 24, depth data 26 and weight data 28) and feed them into a computer vision pipeline formed within the system 10-4.

The imaging system 10-4 can include any of a variety of configurations. For example, the imaging system 10-4 can include a high resolution RGB-depth camera or a RGB camera without depth. To ensure a diffuse lighting environment and/or reduce glare (e.g., from packaging around the meat), the imaging system 10-4 preferably is enclosed within a hood structure 7. As meat products flow along the conveyor belt 76, the imaging system 20 captures both RGB image data 24 and, in some embodiments, depth data 26 at a sufficient capture rate. Preferably, the imaging system 20 captures more than one frame for each meat product/cut of meat 18 (e.g., between 2-15 frames, such as 10 frames). Concurrently, in some embodiments, while the imaging system 20 captures the image information, the modular scale 34 embedded in/on the conveyor 30 measures weight of the cuts of meat 18 and provides the weight data 28 to other components.

Figure 2:
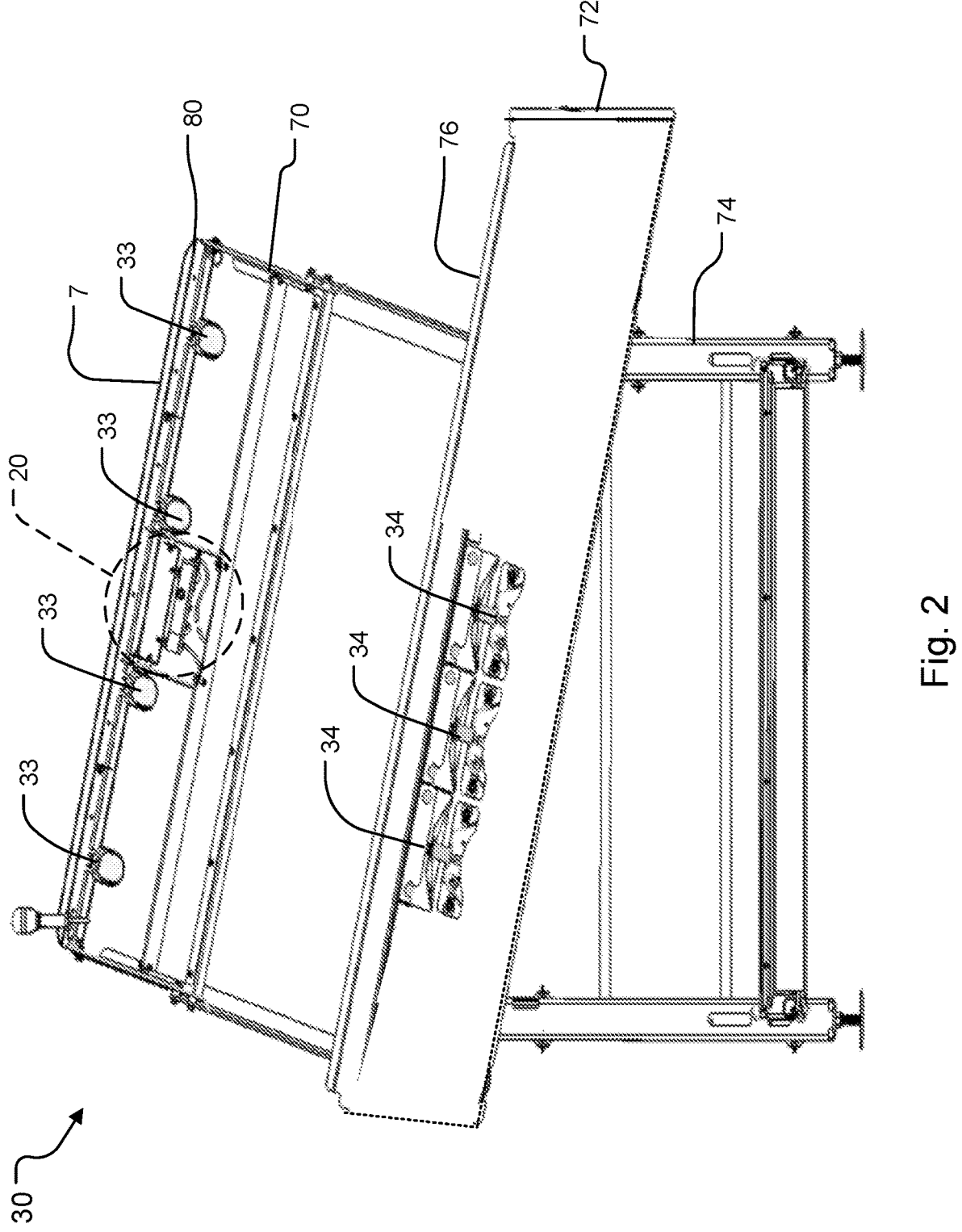
FIG. 2 is a section view of an exemplary conveyor in the meat identification system of FIG. 1D.

FIG. 2 is a section view of the conveyor in FIG. 1D. This view shows detail of the conveyor 30 that could not be shown in FIG. 1D. The view shows rails 80 of the top portion 70, lights 33 and the imaging system 20. The rails 80 enable components of the conveyor 30 such as the lights 33 and the imaging system 20 to attach to the top portion 70, while also enabling workers 8 to adjust these components.

The lights 33 (such as light-emitting diodes) provide a controlled light source to facilitate the capture of high-resolution image data 24 and/or depth data 26. The hood 7 provides a diffuse lighting environment and/or reduces glare.

Figure 3:
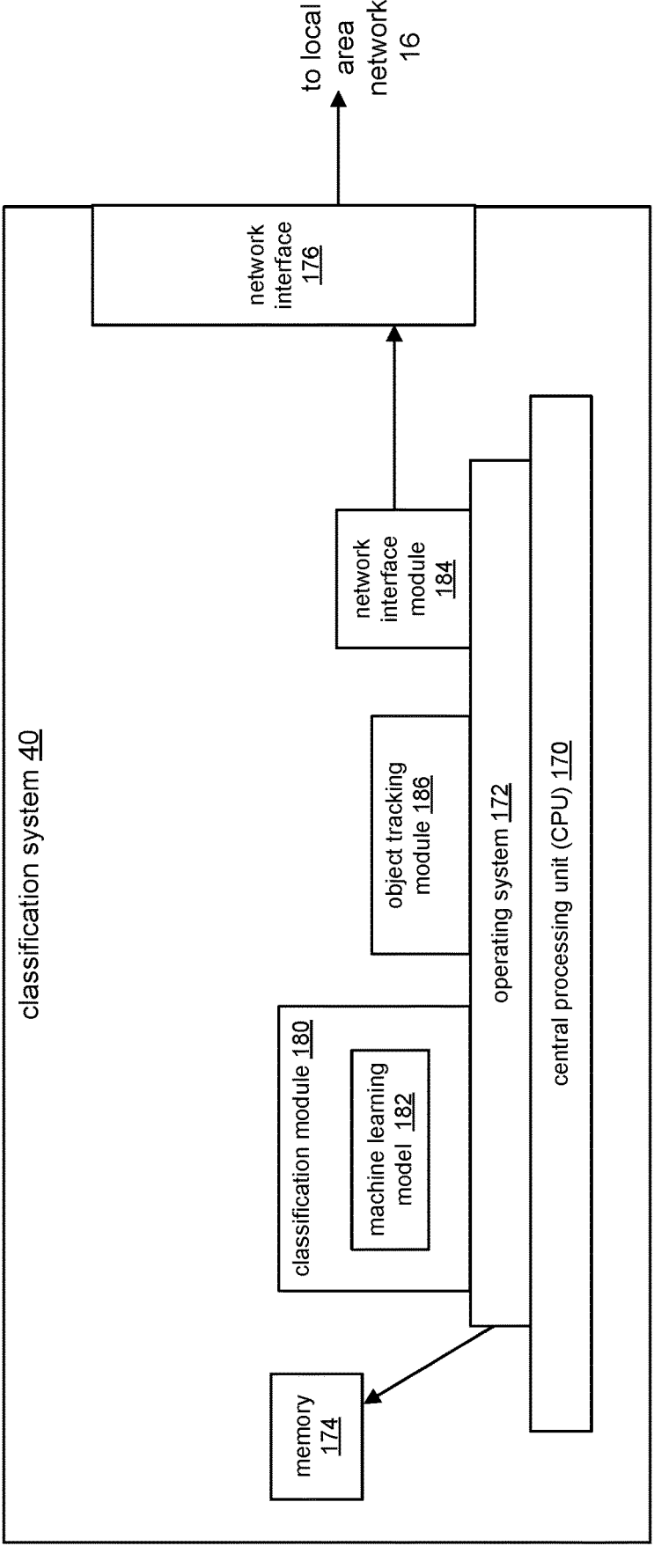
FIG. 3 is a block diagram showing components of an exemplary classification system in the embodiments of FIG. 1A-1D.

FIG. 3 shows detail for an exemplary classification system 40 included in the meat identification system 10. The classification system 40 includes a central processing unit (CPU) 170, an operating system 172, a memory 174, a network interface 176, and various software or firmware applications. The applications include a classification module 180, an object tracking module 186 and a network interface module 184. The classification module 180 includes a machine learning model 182.

The network interface module 184 communicates with the network interface 176. The network interface 176, in turn, connects to the local area network 16. In examples, the CPU 170 might be configured as a microprocessor or a micro-controller.

The operating system 172 enables application code of the applications to be loaded and executed at run-time. Specifically, the operating system 172 can load the application code of the classification module 180, the object tracking module 186 and the network interface module 184 within the memory 174 for execution by the CPU 170, and schedule the execution of the application code by the CPU 170.

In the illustrated example, the operating system 172 and the CPU 170 are components of the classification system 40. This is suited to a "standalone"/computing system-style classification system 40 as shown in FIGS. 1A, 1C and 1D. Here, the classification system 40 is a computer program product that includes at least one processor 170 and a memory 174 including program code, the processor 170 and the memory 174 configured to receive at least one frame of image data 24 of a cut of meat 18 moving along a path 11, and to read the at least one frame of image data 24 and identify the cut of meat 18 based upon the image data 24 in the at least one frame.

However, it can also be appreciated that the classification system 40 might be a component of another computing system, such as a component of the imaging system 20 (as shown in FIG. 1B), or possibly as a component of the server 44. In this example, the applications 180, 184 and 186 are components of the classification system 40, while the CPU 170, the operating system 172, the memory 174 and the network interface 176 are components of the computing system that includes the classification system 40.

Figure 4:
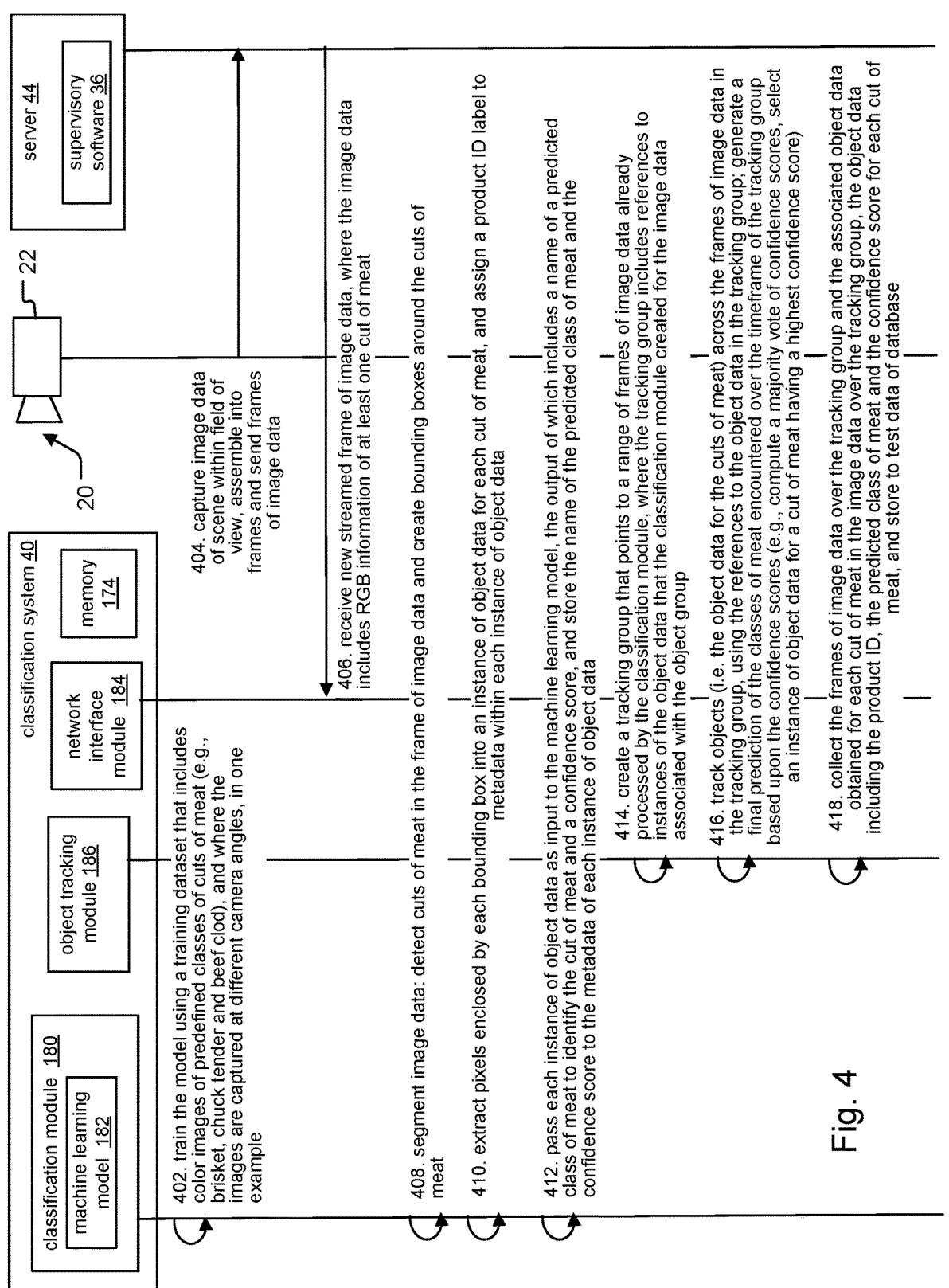
FIG. 4 schematically describes a method of operation of the meat identification systems in FIG. 1A-1D, where the method identifies cuts of meat/predicts classes of the cuts of meat, based upon image data obtained by an imaging system of the meat identification systems.

FIG. 4 illustrates a method of operation of the meat identification system 10. In the illustrated example, only the applications 180, 184, 186 and the memory 174 of the classification system 40 are shown. The method starts at step 402.

At step 402, the classification module 180 of the classification system 40 is trained using a training dataset 31 that includes color images of predefined classes of cuts of meat (e.g., brisket, chuck tender and beef clod). The images can include RGB color images and are captured at different camera angles, in one example. The training dataset 31 might also include images of different sizes and weights of the same cuts of meat 18, and cuts of meat with and without fat, in examples.

For this purpose, the classification system 30 preferably uses a convolutional neural network as the machine learning model 182, where the model 182 is trained to classify product type by leveraging the right feature information from one or more of the RGB images 24, the depth data 26 and the weight data 28 for the same cuts of meat 18. However, other models such as gradient boosted trees may also be used.

In step 404, the imaging system 20 (here, the video camera 22) captures image data 24 of a scene within the field of view 23 of the system 20, assembles the image data 24 into frames and sends the frames of image data 24 to the supervisory software 36 of the server 44. The server 44 collects or buffers the frames of image data 24 and sends them to the network interface module 184 of the classification system 40.

According to step 406, the network interface module 184 receives a new streamed frame of image data 24 from the server 44. In one example, the image data 24 includes RGB information of at least one cut of meat 18. The network interface module 184 then makes the new frame of image data 24 available to the other applications 180, 186 via the memory 174, via inter-process communication, or the like.

In step 408, the segmentation phase, the classification module 180 segments the image data 24. In more detail, the classification module 180 detects one or more cuts of meat 18 in the frame of image data 24 and creates bounding boxes around the cuts of meat 18. In one example, the classification module 180 extracts the bounding boxes of each cut of meat 18 that is fully within the field of view 23 by generating a semantic mask for each. To achieve this, logic and/or a deep learning model is specifically trained to generate semantic masks of the cuts of meat 18 from the frame of RGB image data 24 as the cuts of meat lay on the conveyor belt 76 and in the field of view 23. These semantic masks may be used to convert to corresponding bounding boxes.

At the next step, the classification phase, cuts of meat 18 that have been identified in the segmentation phase are assigned a product ID label that signifies their product type. The portions of the RGB image data 24 and depth data 26 that are encompassed by a cut or meat's bounding box, also known as object data, are then sent as inputs to the machine learning model 182. In one example, the associated weight data 28 for the cut of meat 18 identified by the bounding box can also be sent with the image data 24 as input to the model 182. A subprocess between weight data acquisition and transmission to the classifier model 182 can register the weight data 28 to the location of the bounding box in the field of view 23.

In more detail, in step 410, the classification module 180 extracts pixels enclosed by each bounding box into an instance of object data for each cut of meat 18, and assigns a product ID label to each instance of object data. In one example, the product ID is a number that the classification module 180 assigns to cuts of meat 18 of a same size, color, weight, and/or type. The classification module 180 typically assigns the product ID label to each instance of object data by storing the label to metadata of each instance of object data.

The metadata includes information associated with or otherwise related to the object data. Because each instance of object data is extracted from a frame of image data 24, the metadata for one or more instances of object data can thus include information associated with or otherwise related to the image data 24 from which the object data was extracted. In examples, the metadata can include a time stamp for the image data 24, depth data 26 and weight data 28 for the cut of meat 18 associated with the object data, and various other information that the classification system 40 computes for the object data and stores to the metadata. This information can include a predicted class of meat 42 to identify the cut of meat in the object data and a confidence score, in examples.

According to step 412, the classification module 180 passes each instance of object data as input to the machine learning model 182, the output of which includes a name (or other identifier) of a predicted class of meat to identify the cut of meat 18 and a confidence score. Since illustrative embodiments of the system 10 can capture a given class of meat 18 typically within a range of five to ten consecutive image frames, the machine learning model 182 can make an evidence-based inference of the type of class of meat 18 each time. Each time the model 182 infers information about a cut of meat 18, the model 182 may generate the confidence score, which that represents how confident the model 182 is with its inference. The classification module 180 stores the name of the predicted class of meat and the confidence score to the metadata of each instance of object data.

Then, in step 414, the object tracking module 186 creates a tracking group that points to a range of frames of image data 24 already processed by the classification module 180. The tracking group includes references to instances of the object data that the classification module 180 created for the image data associated with the tracking group.

According to step 416, the object tracking module 186 tracks the objects (i.e. the object data for the cuts of meat 18) across the frames of image data 24 in the tracking group, using the references to the object data in the tracking group. The object tracking module 186 can then generate a final prediction of the classes of meat 42 encountered over the timeframe of the tracking group, based upon the confidence scores of the object data in the tracking group. Accordingly, a final prediction 42 with the highest confidence score for a given cut of meat 18 may be used to identify the cut of meat 18 itself. This has the effect of increasing the overall accuracy of the classification system 40.

In this way, the classification system 40 can obtain a predicted class of meat 42 based on the image data 24 to identify the cut of meat, and obtain a range of successive frames of image data that include the cut of meat as the meat moves along the path 11. The classification system 40 can then use information relating to the cut of meat obtained across the range of frames of image data (e.g., the metadata of the instances of object data in the tracking group, for the range of frames) to finalize the prediction of the class of meat 42.

In more detail, the object tracking module 186 might access the object data obtained for each frame of image data 24 in the tracking group, and for the same cut of meat 18, select the highest confidence score among the instances of object data for the same cut of meat. The classification system 40 can then use the selected confidence score to update/finalize the prediction of the class of meat 42 for the cut of meat 18.

In another example, the object tracking module 186 might compute a majority vote from the confidence scores of the object data over the tracking group. To achieve this, the classification system 40 understands that the object data associated with a cut of meat 18 obtained from a number of consecutive frames of image data 24 are associated with the same cut of meat 18. To that end, the object tracking module 186 can measure the similarity of object data for cuts of meat 18 within consecutive frames of image data 24.

For example, when a new cut of meat 18 enters the field of view 23 of the imaging system 20 from the right, for example (e.g., when the conveyor 30 moves the cuts of meat along the path 11 from right to left,) the object tracking module 186 recognizes the corresponding object data obtained by the classification module 180 for that cut of meat 18 as a new product, and assigns a unique product ID to the object data. In the next frame of image data 24, the bounding box/object data for the same cut of meat 18 will be shifted slightly to the left. The object tracking module 186 thus measures pair combinations between bounding boxes/object data from the previous frame to that of the current frame to establish equivalences between bounding boxes/object data. The equivalence may be established based on 1) a similarity function that measures how similar the RGB content of two bounding boxes/instances of object data for the bounding boxes are, and 2) if the measurement exceeds a predefined threshold, in examples.

If those conditions are met, then object tracking module 186 can conclude that the two bounding boxes/instances of object data are associated with the same cut of meat 18, and the instance of object data in the current frame of image data 24 is assigned the same product ID as the instance of object data in the last frame. The equivalences of the bounding boxes/object data for a given cut of meat 18 are established iteratively as the cuts of meat 18 move, in this example, from the right side to the left side of the field of view 23 of the imaging system 20.

After the cuts of meat 18 leave the field of view 23, the object tracking module 186 can make a prediction using the highest confidence score as the final prediction of the class of meat 42.

As noted above, the classification system 40 can exclude the weight data 28 and still generate a classification for many vacuum-sealed cuts of meat 18, non-vacuum-sealed cuts of meat 18, or unpackaged cuts of meat 18. The scale 34, via its weight data 28, may help the classification system 40 differentiate cuts of meat 18 that look too similar to be classified by image data 24 alone, but have a significant difference in their average weights. For example, some implementations may weigh ambiguous cuts of meat 18, while other cuts of meat 18 may not require a weight.

In step 418, the object tracking module 186 collects the frames of image data 24 over the tracking group and the associated object data obtained for each cut of meat 18 in the image data over the tracking group, the object data including the product ID, the predicted class of meat and the confidence score for each cut of meat, and stores to a time-stamped record within the run data 21 of the database 14.

Figure 5:
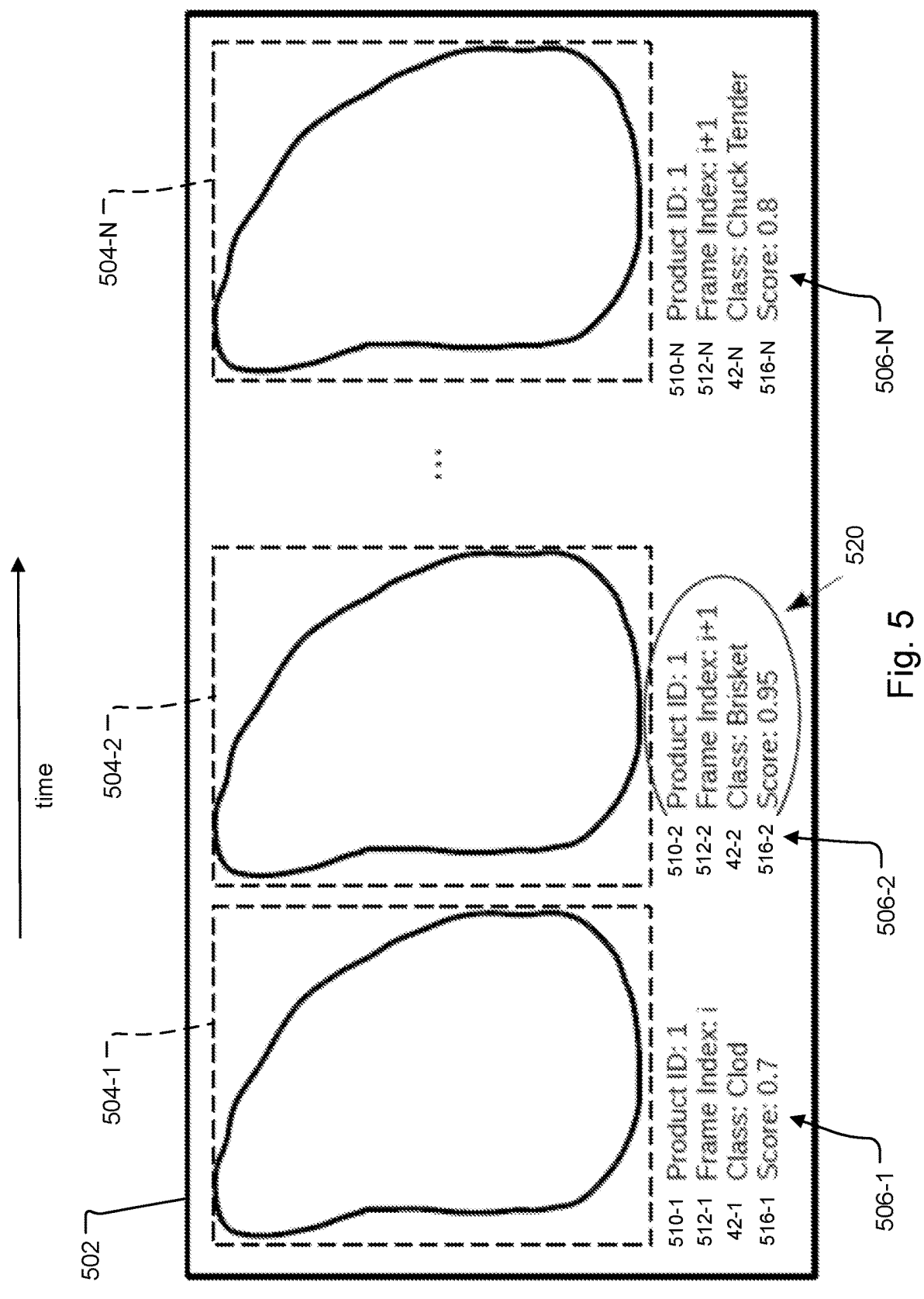
FIG. 5 schematically shows an example of an object tracking technique performed by an object tracking module of the classification system, configured in accordance with illustrative embodiments, where the object tracking technique can be used to improve upon or otherwise finalize the predicted classes of meat.

FIG. 5 shows an exemplary tracking group 502 for a range of successive frames of image data 24, and illustrates how the classification system 40 can improve upon the prediction of the classes of meat 42 over time. The tracking group, and the processing performed by the classification system 40 described below, are in accordance with the method of FIG. 4.

Each instance of object data 504-1, 504-2 . . . 504-N in the tracking group 502 includes associated metadata 506-1, 506-2, . . . 506-N. In the illustrated example, the metadata 506 includes a product ID 510, a frame index 512, a predicted class of a cut of meat 42 and a confidence score 516.

By way of background, as the classification system 40 receives each frame of image data 24, the classification module 180 detects different cuts of meat in the image data 24. The classification module 40 then calculates or otherwise extracts an instance of object data 504 for each cut of meat 18 detected in the image data 24, calculates a predicted class of meat 42 for each detected cut of meat 18 and a confidence score 516, and stores this information to metadata 506 of the object data 504. Here, the classification module 180 operates continuously on each frame of new image data 24 that arrives.

At the same time, the object tracking module 186 also runs continuously, selecting anywhere between 5-15 frames (or possibly between 5 and 20 frames) of image data 24 already processed by the classification module 180. For this purpose, the object tracking module 186 creates a tracking group 502 in the memory 174 that is associated with a range of successive frames of image data 24 already processed into associated object data 504 by the classification module 180. The tracking group 502 includes references to each instance of object data 504 that the classification module 180 computed for the image data 24 covered by the tracking group 502. Using the instances of the object data 504 across the tracking group 502, the object tracking module 186 can improve upon the predicted classes of meat 42 over time.

The figure illustrates, by way of an example, how the classification system 40 can improve upon the predicted class of meat 42 for a single cut of meat 18 over time. When a cut of meat first arrives within the field of view 23 of the imaging system 20, the classification module 180 detects a cut of meat 18 in the initial frame 512-1 (value i) of the image data 24. The classification module 180 extracts an instance of object data 504-1 for the cut of meat 18 from the image data 24. The classification module 180 assigns a product ID 510-1 (value 1), computes a predicted class of meat 42-1 (value "Clod,") and a confidence score 516-1 (value 0.7). The classification module 180 stores this information along with the frame index 512-1 to the metadata 506-1 of the object data 504-1.

The classification module 180 accesses the next frame 512-2 (value i+1) of image data 24 in the tracking group, detects the same cut of meat 18, and extracts an instance of object data 504-2 for the same cut of meat in the image data 24. In a similar vein, the classification module 180 computes and assigns the following to instance of object data 504-2: a product ID 510-2 (value 1), a predicted class of meat 42-2 (value "Brisket,") and a confidence score 516-2 (value 0.95). The classification module 180 stores this information along with the frame index 512-2 to the metadata 506-2 of the object data 504-2.

The classification module 180 repeats this process for each cut of meat 18 in each frame of image data 24, as long as the meat identification system 10 is running. As shown in the figure, the classification module 180 identifies an Nth frame of image data 24, computes an associated Nth instance of object data 504-N, and assigns the following to the metadata 506-N of the object data 504-N: a product ID 510-N (value 1), a predicted class of meat 42-N (value "Brisket,") and a confidence score 516-N (value 0.95). The classification module 180 stores this information along with the frame index 512-N to the metadata 506-N of the object data 504-N.

At the same time, the object tracking module 186 tracks a successive number of frames of image data (indicated by N in the figure) already processed by the classification module 180. In examples, N can be as small as 5, or as large as 15 or 20, in examples. For this purpose, the object tracking module 186 tracks the instances of object data 504-1, 504-2 . . . 502-N for each cut of meat 18, and can improve upon the predicted class of meat 42 for a cut of meat 18 over time.

In the illustrated example, the object tracking module 186 accesses the confidence scores 516 across the object data 504 of the tracking group 502, and selects the instance of object data 504 having the largest confidence score (here, object data 504-2 with confidence score 516-2 of 0.95). This is indicated by reference 520 in FIG. 5.

Figure 6:
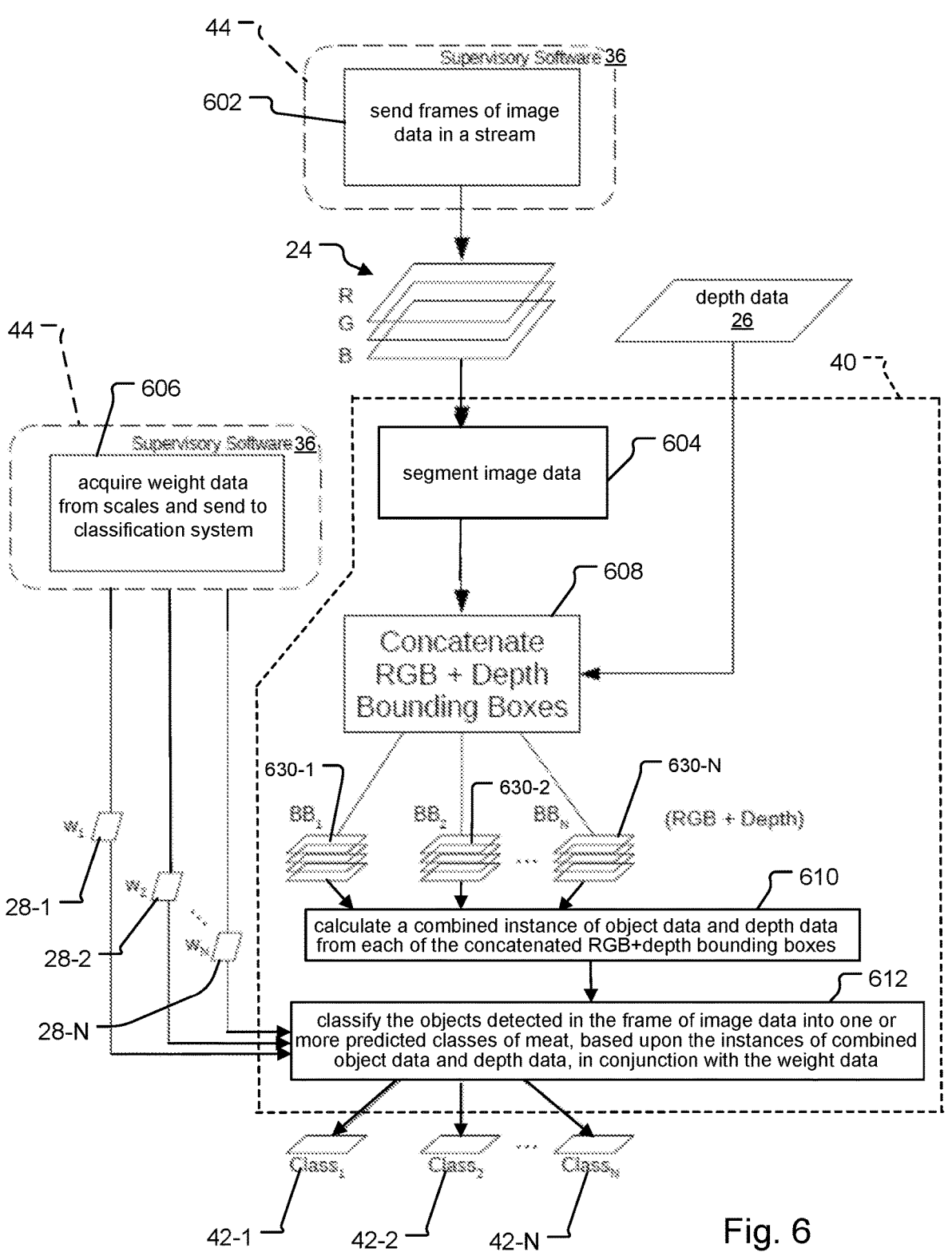
FIG. 6 schematically shows another method of operation of the meat identification systems in FIG. 1A through 1D, where the method identifies cuts of meat/predicts classes of the cuts of meat, based upon a combination of the following: image data obtained by a video camera as the imaging system, depth data obtained by a depth sensor, and weight data obtained by one or more scales; and where components of the meat identification system illustrated in the figure form a computer vision pipeline.

FIG. 6 describes another method of the meat identification system 10. In this method, the system 10 identifies cuts of meat 18 based upon a combination of the following: frames of RGB image data 24, depth data 26 and weight data 28.

In step 602, the server 44 sends frames of RGB image data 24 including one or more cuts of meat 18 in a stream to the classification system 40. At the classification system 40, in step 604, the classification system 40 segments the image data 24 into RGB bounding boxes for each cut of meat 18 detected in the image data 24.

In step 606, the server 42 acquires weight data 28 sent from the scales 34, where the weight data 28 was obtained over the same timeframe as the image data 24, and sends the weight data 28 to the classification system 40.

According to step 608, the classification system 40 receives depth data 26 of cuts of meat 18 over the same timeframe as the image data 24 and the weight data 28, creates depth bounding boxes, and concatenates the RGB bounding boxes and the depth bounding boxes into combined RGB+depth bounding boxes 608-1 . . . 608-N for each detected cut of meat 18 over the same time frame.

According to step 610, the classification system 40 calculates a combined instance of object data and depth data 630-1 . . . 630-N from each of the concatenated RGB+depth bounding boxes.

In step 612, the classification system 40 classifies the objects detected in the frame of image data 24 into one or more predicted classes of meat 42-1, 42-2 . . . 42-N, based upon the instances of combined object data and depth data 630, in conjunction with the weight data 28. The predicted classes of meat 42-1, 42-2 . . . 42-N identify the associated cuts of meat 18.

Classification System 40 Training Method

The machine learning model 182 takes as input image data 24 of a cut of meat and outputs a product classification in the form a prediction of a class of meat 42. As such, a training pipeline of the meat identification system 10 is used to train the machine learning model 182. The pipeline has been developed such that image data 24 can flow through the pipeline on a continual basis and the model 182 can be updated as needed with minimal manual intervention. The pipeline follows the principles of continuous integration/ continuous deployment (CI/CD) paradigm, better known as Machine Learning Operations (MLOps) in the field of machine learning.

The training pipeline begins with server 44 transferring image data 24 to cloud storage at the remote network 12, such as storing the image data 24 to the run data 21 at the database 14. In one example, the frames of the image data 24 are randomly sampled from the cloud storage and pushed to user devices carried by the workers 8 as part of annotation jobs. Annotation jobs are tasks where human annotators such as the workers 8 can label image data 24 on a frame-by-frame basis through a user interface (UI), such as via the display of their mobile phone user device or desktop system. The image frames 24 presented to the annotator 8 via the UI already include bounding boxes drawn around all the cuts of meat 18 in each frame. These bounding boxes are derived from the image segmentation process described herein above.

The annotators/workers 8 are also provided pre-annotations for each bounding box. The pre-annotation is the classification provided by the machine learning model 182 for that specific instance of the cut of meat 18. Therefore, the annotator's sole job is to validate that the machine learning model 182 made the proper classification for the given bounding box. If the machine learning model 182 made an incorrect classification, the annotator has the ability to adjust the label to the correct classification through the UI.

Since image data 24 is continually being transferred/stored to cloud storage, annotation jobs are also being created on a continual basis. The results from these jobs are extracted and the samples that the machine learning model 182 wrongly classified are batched and sent to a training session where the model 182 is fine-tuned. The fine-tuned model 182 is then evaluated against a test dataset 41. The test dataset 41 comprises a representative group of samples that have been sequestered and are not used for training purposes. The evaluation results are compared with those from the currently deployed machine learning model 182. If the evaluation results show an improvement as compared to the results of the currently deployed model 182, this triggers a deployment of the new model 182 to the classification system 40.

In this way, the system 10 can apply a test dataset 41 to a current version of the machine learning model 182 to obtain training evaluation results concerning the machine learning model 182, and apply the test dataset 182 to a copy of the machine learning model in a training session to obtain training evaluation results concerning the copy. Then, in response to determining that the training evaluation results of the copy show an improvement as compared to the training evaluation results of the current version of the model, the system can deploy the copy as the current version of the model 182. In examples, the deployment of the new model can be scheduled for a later time, or applied in real-time as part of a continuous training feedback loop.

A feature of the training pipeline is the set of methodologies employed to reduce the size of the training dataset 41 needed to achieve high performance from the machine learning model 182. These methodologies strive to take already collected data and create data that seems new to the machine learning model 182. These methodologies are better known in the machine learning field as data augmentation techniques. Aside from the typical data augmentation techniques that are commonly used for machine learning tasks (random cropping of image, random brightness adjustments, random flipping of image, etc), a suite of data augmentation techniques can be implemented that perform more robust transformations of the cuts of meat 18 within the image data 24. These techniques include elastic transformations that reconfigure the pixels of the image data 24 associated with the cuts of meat and fat patterns within the cuts meat 18 to make them look different from the original image data 24, yet still appear to be an actual sample from their respective product classes.

Another feature of the training pipeline is its ability to perform concurrent training sessions. By way of background, in general, a majority of the machine learning model development cycle is spent tuning hyper-parameters of a model, running a training session, and evaluating the trained model. A machine learning engineer can go through several iterations of this cycle before the desired performance is achieved, thereby elongating the development cycle. In contrast, the training pipeline can automate this experimentation by running multiple concurrent training sessions with varying hyper-parameters. These training sessions are typically performed on the cloud/remote network 12 where computing resources are plentiful. The evaluation results from all the training sessions are compared with the evaluation results of the currently deployed model, and the model 182 with the highest performance is automatically deployed to the classification system 40.

Due to the fact that meat processing plants are apt to change the specifications of their meat products/cuts of meat 18, it is important that the pipeline continually monitor the performance of the currently deployed machine learning model 182. As such, the pipeline has been developed to automatically push validation jobs on a regular cadence/schedule to measure model performance. Validation jobs are similar to annotation jobs in that they involve human annotators. Unlike the annotation jobs, the information presented to the UI for a validation job includes labeled bounding boxes in a grid format (usually a 4×4 grid) on a per class basis. This means that validation jobs are separated by product class, and the grid sheets of a given validation job will only display bounding boxes that the machine learning model 182 classified as that respective product class. This facilitates and expedites the validation process, as annotators can quickly peruse the grid sheets and identify bounding boxes that are not part of the corresponding product class of the validation job. For the wrongly classified samples, the annotators are able to provide the correct classification. All the wrongly classified samples are extracted from these jobs with their new labels and are sent through the training pipeline for further fine-tuning of the model 182.

The training pipeline described herein above represents a machine learning Operations ("MLOps") infrastructure that streamlines and automates the model refinement process in a way that requires very little manual intervention. The overall goal of this pipeline is to have it run on a continual basis in such a way that it can automatically detect when a change has occurred with a product specification/specification for one or more cuts of meat 18 and adjust the machine learning model 182 accordingly. Due to the level of automation afforded by the training pipeline, multiple production units/meat identification systems 10 in a facility can be supported in an efficient manner.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

While this invention has been particularly shown and described with references to preferred embodiments thereof, it will be understood by those skilled in the art that various changes in form and details may be made therein without departing from the scope of the invention encompassed by the appended claims.

What is claimed is:

1. A meat identification system, the system comprising:
an imaging system configured to obtain at least one frame of image data of a cut of meat moving along a path and to capture an imaging timestamp of when the imaging system obtains the at least one frame of image data;
a scale configured to weigh the cut of meat to obtain a weight of the cut of meat while the imaging system is obtaining the at least one frame of image data and to capture a weighing timestamp of when the scale weighs the cut of meat;
a classification system configured to read the at least one frame of image data, the imaging timestamp, the weight of the cut of meat, and the weighing timestamp, match imaging timestamp and the weighing timestamp to associate the weight of the cut of meat with the at least one frame of image data of the cut of meat, and utilize the image data and the matched weight in an initial classification to identify the cut of meat;
a hood configured to provide a diffuse lighting environment and reduce glare during capture of the image data; and
lighting elements comprising lights that provide a controlled light source to facilitate capture of high-resolution image data and depth data;

wherein the hood is incorporated into a top portion of a conveyor, and rails in the top portion are configured to mount and allow adjustment of the lighting elements and the imaging system.

2. The system of claim 1, further comprising a conveyor configured to move a plurality of cuts of meat along the path, wherein the imaging system is positioned to obtain the at least one frame of image data of the plurality of cuts of meat as the conveyor moves the plurality of cuts of meat along the path.

3. The system of claim 1, further comprising a depth sensor to detect depth data about the cut of meat, wherein the classification system is configured to identify the cut of meat based upon the image data and the depth data.

4. The system of claim 1, wherein the classification system is configured to segment the at least one frame of image data to produce segmented information, to form a bounding box around the cut of meat using the segmented information, and to extract pixels of the cut of meat enclosed by the bounding box into an instance of object data for the cut of meat.

5. The system of claim 4, wherein the classification system passes the object data for the cut of meat to a machine learning module, the output of which includes a predicted class of meat to identify the class of meat.

6. The system of claim 1, wherein the cut of meat is within a vacuum packed package.

7. The system of claim 1, wherein the classification system includes a machine learning model that implements a convolutional neural network.

8. The system of claim 1, wherein the classification system is configured to obtain a predicted class of meat based on the image data to identify the cut of meat, and to obtain a range of successive frames of image data that include the cut of meat as the meat moves along the path, and wherein the classification system is configured to use information relating to the cut of meat obtained across the range of frames of image data to finalize the prediction of the class of meat.

9. The system of claim 1, wherein the classification system is configured to produce a confidence score relating to the identified cut of meat.

10. A meat identification method, the method comprising:
obtaining at least one frame of image data of a cut of meat moving along a path and capturing an imaging timestamp of when the at least one frame of image data is obtained;
weighing the cut of meat with a scale while an imaging system is obtaining the at least one frame of image data to obtain a weight of the cut of meat and capturing a weighing timestamp of when the scale weighs the cut of meat;
controlling a hood to provide a diffuse lighting environment and reduce glare during capture of the image data;
controlling lighting elements comprising lights that provide a controlled light source to facilitate capture of high-resolution image data and depth data, wherein the hood is incorporated into a top portion of a conveyor, and rails in the top portion are configured to mount and allow adjustment of the lighting elements and the imaging system;
matching the imaging timestamp and the weighing timestamp to associate the weight of the cut of meat with the at least one frame of image data of the cut of meat; and
identifying the cut of meat based upon the image data in the at least one frame and utilizing the matched weight in an initial classification.

11. The method of claim 10, wherein identifying the cut of meat based upon the image data in the at least one frame comprises passing information relating to the cut of meat obtained from the at least one frame of image data as input to a machine learning model, the output of which is a predicted class of meat for identifying the cut of meat.

12. The method of claim 11, further comprising:

applying a test dataset to a current version of the machine learning model to obtain training evaluation results concerning the machine learning model;

applying the test dataset to a copy of the machine learning model in a training session to obtain training evaluation results concerning the copy; and in response to determining that the training evaluation results of the copy show an improvement as compared to the training evaluation results of the current version of the model, deploying the copy as the current version.

13. The method of claim 10, further comprising passing a training dataset to a machine learning model to train the machine learning model to identify the cut of meat, the training dataset including a plurality of red/green/blue (RGB) color images of the cut of meat obtained at different camera angles.

14. The method of claim 10, wherein identifying the cut of meat based upon the image data comprises segmenting the at least one frame of image data to produce segmented information, forming a bounding box around the cut of meat using the segmented information, extracting pixels of the cut of meat enclosed by the bounding box into an instance of object data for the cut of meat, and calculating a predicted class of meat and a confidence score based upon the object data.

15. The method of claim 10, wherein identifying the cut of meat based upon the image data comprises:

obtaining a range of successive frames of image data that include the cut of meat as the meat moves along the path;

obtaining an instance of a predicted class of meat, for each frame of image data in the range of frames that includes the cut of meat; and calculating a final predicted class of meat based upon the instances of the predicted class of meat across the range of frames.

16. The method of claim 10, further comprising detecting depth data about the cut of meat, and identifying the cut of meat based upon the image data and the depth data.

17. A non-transitory computer-readable medium comprising instructions that, when executed by at least one processor, cause the at least one processor to:

receive at least one frame of image data of a cut of meat moving along a path and an imaging timestamp of when the at least one frame of image data is obtained;

receive a weight of the cut of meat obtained by a scale while an imaging system is obtaining the at least one frame of image data and a weighing timestamp of when the scale weighs the cut of meat;

control a hood to provide a diffuse lighting environment and reduce glare during capture of the image data;

control lighting elements comprising lights that provide a controlled light source to facilitate capture of high-resolution image data and depth data, wherein the hood is incorporated into a top portion of a conveyor, and rails in the top portion are configured to mount and allow adjustment of the lighting elements and the imaging system;

match the imaging timestamp and the weighing timestamp to associate the weight of the cut of meat with the at least one frame of image data of the cut of meat; and read the at least one frame of image data together with the matched weight and utilize the image data and the matched weight in an initial classification to identify the cut of meat.

\* \* \* \* \*